US008176096B2

(12) United States Patent
Allyn et al.

(10) Patent No.: US 8,176,096 B2
(45) Date of Patent: May 8, 2012

(54) DATA VISUALIZATION INTERACTIVITY ARCHITECTURE

(75) Inventors: Barry C. Allyn, Snohomish, WA (US); Chris Becker, Redmond, WA (US); B. Scott Ruble, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 12/337,851

(22) Filed: Dec. 18, 2008

(65) Prior Publication Data

US 2010/0162152 A1    Jun. 24, 2010

(51) Int. Cl.
    *G06F 7/00* (2006.01)
(52) U.S. Cl. ...................................................... 707/805
(58) Field of Classification Search .................. 707/805, 707/999.107
    See application file for complete search history.

(56) References Cited

U.S. PATENT DOCUMENTS

| | | | | |
|---|---|---|---|---|
| 5,461,708 A | | 10/1995 | Kahn et al. ..................... | 395/140 |
| 5,581,677 A | | 12/1996 | Myers et al. .................... | 395/140 |
| 6,320,586 B1 | * | 11/2001 | Plattner et al. ................. | 715/700 |
| 6,400,366 B1 | * | 6/2002 | Davies et al. .................. | 345/440 |
| 6,529,900 B1 | | 3/2003 | Patterson et al. | |
| 6,707,454 B1 | | 3/2004 | Barg et al. | |
| 6,995,768 B2 | | 2/2006 | Jou et al. | |
| 7,975,239 B2 | * | 7/2011 | Bellotti et al. ................ | 715/825 |
| 2003/0167278 A1 | * | 9/2003 | Baudel ........................... | 707/102 |
| 2004/0017404 A1 | * | 1/2004 | Schileru-Key ................ | 345/854 |
| 2004/0119713 A1 | * | 6/2004 | Meyringer ..................... | 345/440 |
| 2005/0232055 A1 | * | 10/2005 | Couckuyt et al. ............. | 365/227 |
| 2006/0112123 A1 | * | 5/2006 | Clark et al. ................... | 707/101 |
| 2006/0156246 A1 | | 7/2006 | Williams et al. | |
| 2007/0022000 A1 | * | 1/2007 | Bodart et al. .................. | 705/10 |
| 2007/0156677 A1 | * | 7/2007 | Szabo .............................. | 707/5 |
| 2007/0171716 A1 | * | 7/2007 | Wright et al. ............. | 365/185.12 |
| 2007/0226314 A1 | * | 9/2007 | Eick et al. ...................... | 709/217 |
| 2007/0245227 A1 | * | 10/2007 | Hyland et al. ................. | 715/505 |
| 2008/0180458 A1 | | 7/2008 | Favart et al. ................... | 345/630 |
| 2010/0083172 A1 | * | 4/2010 | Breeds et al. ................. | 715/810 |

OTHER PUBLICATIONS

International Search Report issued Apr. 23, 2010 in PCT/US2009/064325 filed Nov. 13, 2009.
Daniel E. Keim, Information Visualization and Visual Data Mining, Jan.-Mar. 2002, 8 pgs.
Jens Kruger et al., "ClearView: An Interactive Context Preserving Hotspot Visualization Technique", 2006, 8 pgs.
WebGrid.NET Enterprise 6.0, "Pivot Charting", http://www.intersoftpt.com/WebGridWhitePaper/WebGridNET6_WhitePaper_Charting.pdf 52 pgs.
Guavus "Visualization Techniques For Networking Data", 2008, 16 pgs.
Thomas Baudel, "From Information Visualization to Direct Manipulation Using ILOG Discovery", 2005, 10 pgs.
Terek Peterson et al. Creating ActiveX Graphs for Presentations Using SAS Enterprise Guide . . . And Drill-Down Graphs Too, 2006, 13 pgs.

\* cited by examiner

*Primary Examiner* — Kimberly Lovel
*Assistant Examiner* — Mohammed R Uddin
(74) *Attorney, Agent, or Firm* — Merchant & Gould

(57) ABSTRACT

A data visualization interactivity architecture may be provided. The architecture may allow the creation of a data visualization, such as a chart, and may expose an interactive feature on the visualization. The architecture may provide integration with multiple rendering platforms. When a user selects the exposed feature, the architecture may translate the selection into a common format and modify the data visualization according to layout rules independent of the rendering platform.

18 Claims, 12 Drawing Sheets

DATA VISUALIZATION INTERACTIVITY ARCHITECTURE

BACKGROUND

Data visualization interactivity architecture is a process for enabling interactive data visualization in a way that may maximize code sharing across many different rendering platforms. In some situations, data visualization features need to be re-implemented entirely within different rendering platforms because of the significant differences among the rendering platforms. Interactive data visualization may allow users to manipulate parts of a visualization, such as a scatter chart, to explore the data. For example, a scatter chart may comprise thousands of data points that may make it difficult to analyze trends or patterns. Dragging a selection marquee around a set of data points in the scatter chart may zoom in on the data points thus revealing more detail. The conventional strategy is to entirely re-implement the zoom feature for each of a multitude of rendering platforms, such as GDI/GDI+, Silverlight, WPF, and C# winforms. This often causes problems because the conventional strategy may result in a great deal of duplicate effort and possibility for incompatibility, errors, and inconsistencies in presentation. The motivation for developing a sharable architecture for interactive data visualization serves a growing user need for consistent interactivity across a plethora of rendering technologies and applications using them.

SUMMARY

A data visualization interactivity architecture may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A data visualization interactivity architecture may be provided. The architecture may allow the creation of a data visualization, such as a chart, and may expose an interactive feature on the visualization. The architecture may provide integration with multiple rendering platforms. When a user selects the exposed feature, the architecture may translate the selection into a common format and modify the data visualization according to layout rules independent of the rendering platform.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1A:
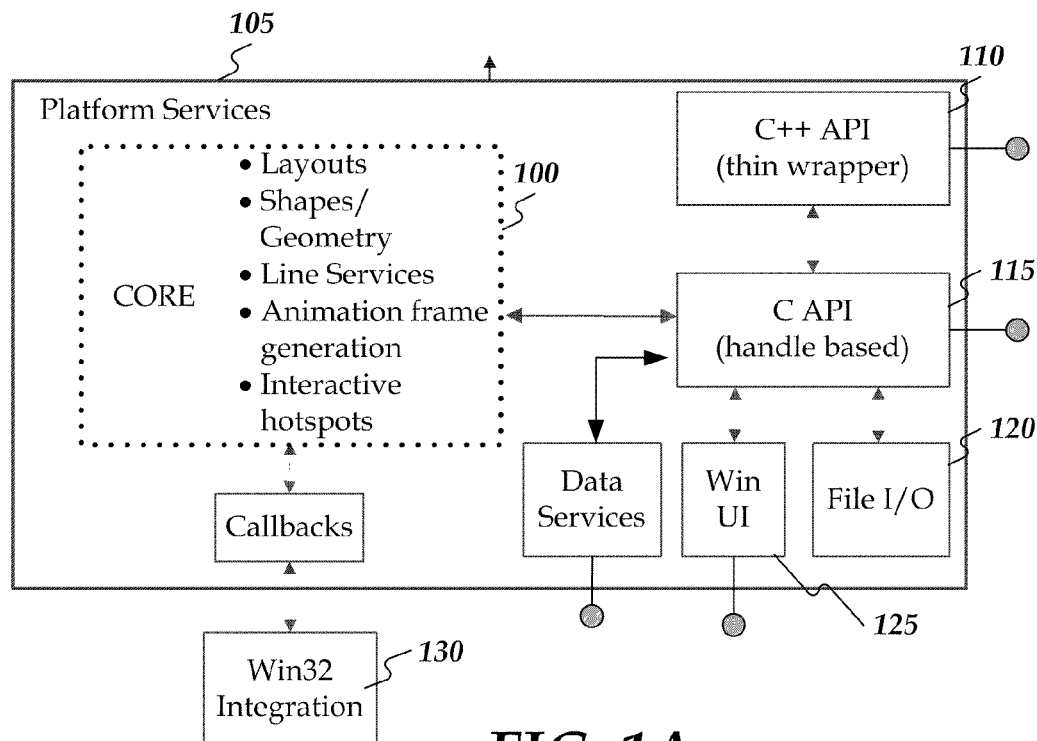
FIG. 1 is a block diagram of an interactivity visualization architecture.
Figure 1B:
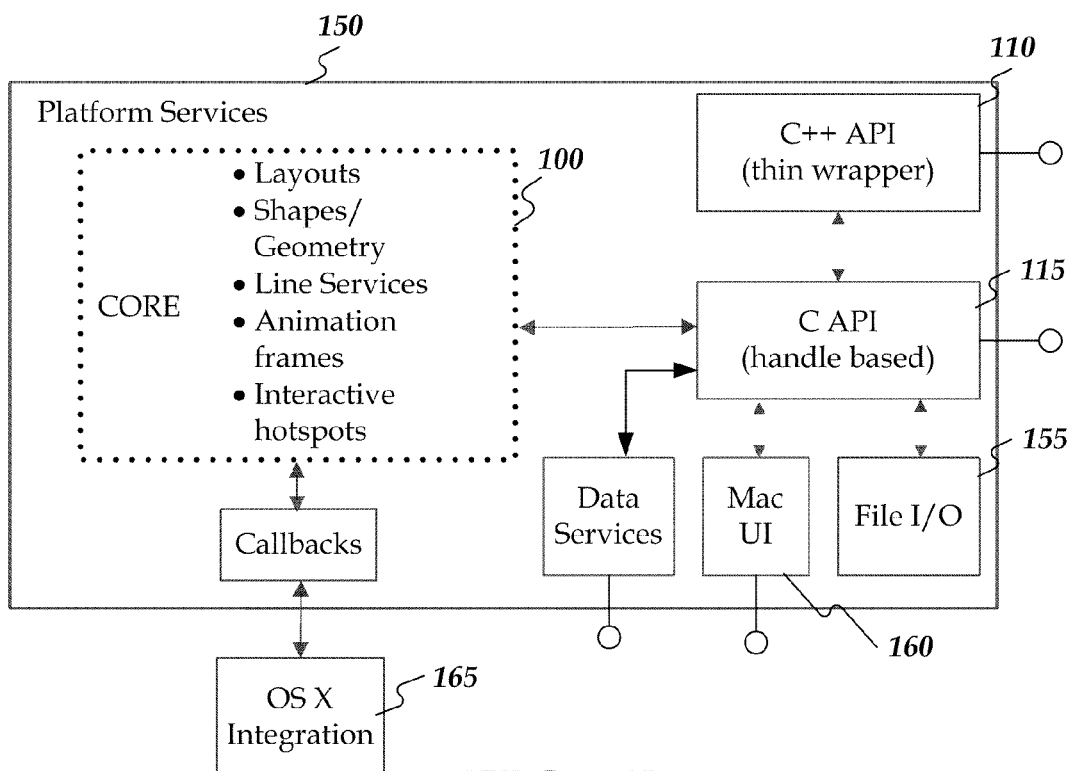

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A data interactivity visualization architecture may be provided. Consistent with embodiments of the present invention, a Windows® data visualization platform 105 and an OS X® data visualization platform 150 may each comprise a shared core 100 comprising software libraries and/or utilities for providing interactive visualizations. Shared core 100 may be implemented, for example, in C++ or C#, and may be platform independent. Shared core 100 may comprise visualization utilities for providing layouts, shapes and/or geometry, line services, 3-dimensional rendering, animation frame generation, and/or interactive hotspots. application programming interfaces (APIs).

Data visualization platform 100 may represent a set of known interactivity features gathered from existing data visualization clients. For example, shared core 100 may comprise utilities for displaying at least one of a pie chart, a bar chart, a scatter chart, a column chart, a line chart, an area chart, a doughnut chart, a radar chart, a surface chart, a bubble chart, and a stock chart. Each type of chart may comprise at least one interactive feature, such as a data modification feature, a data filtering feature, and a visual adjustment feature. Each chart type may comprise interactive features specific to that type and/or interactive features common to multiple types. For example, a pie chart may comprise a chart type-specific visual adjustment feature enabling a user to click on and select a wedge of the pie chart and enlarge the wedge and display additional information about the underlying data represented by the wedge. The pie chart may further comprise a feature common to multiple types, such as enabling a user to drag a legend display to a different location. Data modification features may comprise receiving changes to underlying data elements of the visualization, such as changing the value of a point on a graph, and updating the visualization accordingly. Data filtering features may comprise enabling selection of a subset of data points, such as through a search, zoom, pan, or other subset selection. Visual adjustment features may comprise receiving changes to the visual appearance of the visualization such as changing a color, a line width and/or type, and/or a point representation icon. Other interactivity features may comprise moving a graph axis and/or reference line, adjusting a column and/or bar representation width, iterating a data point set, providing additional information about a section and/or point of the visualization, predicting at least one effect of a data change, copying a visualization in whole and/or in part, sorting data, reordering data points and/or legend entries, resizing data points and/or structural elements of the visualization, highlighting, pivoting, rotating, and displaying a tooltip. Consistent with embodiments of the invention, user selection of an interactive feature may be achieved through any input received from a user input device associated with an exposed interactive feature, such as a movement of a pointer over an area of the visualization, a keyboard input, and/or a mouse movement and/or click.

Windows® data visualization platform 105 and OS X® data visualization platform 150 may comprise shared application programming interfaces (APIs), such as C++ API 110 and C API 115. Data visualization platform 105 may comprise Windows® platform specific utilities such as a Windows® file I/O library 120 and a Windows® user interface (UI) library 125. Consistent with embodiments of the invention, file I/O library 120 and UI library 125 may be implemented as dynamically linked libraries (DLLs). Data visualization platform 150 may comprise OS X® platform specific utilities such as an OS X® file I/O library 155 and an OS X® user interface (UI) library 160.

Shared core 100 may expose the interactivities in each chart type via HotSpot objects that may surface an area of the chart for which an interactive feature may be available. For each rendering platform, an integration object may comprise integration code to provide generic interface information usable by the data visualization platform for that rendering platform. For example, Windows® data visualization platform 105 may comprise a Win32 integration object 130 and OS X® data visualization platform 150 may comprise an OS X® integration object 165. The integration object for each data visualization platform may comprise software libraries and to provide a mouse cursor feedback and hit testing utility, a drag-drop loop utility that may capture mouse down, mouse move, and mouse up (e.g. click, drag, and release), a utility to draw a drag image that may be supplied by shared core 100 while dragging, and a utility to commit a changelist. The changelist may comprise a list of user inputs such as mouse movements and/or keystrokes recorded during a drag-drop loop. The changelist may describe data changes (e.g. change value, reorder values, filter by area) as well as shape changes (move, rotate, size).

Each integration object may be responsible for converting platform-specific user input data into a common version for submission to shared core 100. The integration object may not need any chart-specific information to provide these utilities, allowing the single object to expose all of the interactive features associated with each chart-type provided by shared core 100.

Various chart types may be exposed by the data visualization platform (DVP) and may each have specific areas of interactivity that are unique to those chart types. To expose those interactive areas, the top edge of a column, for example, the DVP may expose a hotspot. Each chart type may encode various hot spots specific to that chart type and expose the interactivity through that. A client may encode a very generic interface that may allow the client to make use of the interactive features exposed by the hotspots based on an interaction with a mouse and a simple commit step. The generic interface may comprise three pieces: mouse hit testing logic, a drag and drop loop, and a commit step. Once those pieces are in place, the client may hook into all of the chart specific hotspots that the DVP may surface.

Hit testing may comprise moving a user input device around and the client requesting information from the DVP as to what the user input cursor is over. The DVP may respond with that information, for example, a data point, or a shape, or nothing. The DVP may also will say inform the client that a hotpot is under the cursor. The client may then receive a reference to the hotspot and go into a drag and drop loop. As the client's user input cursor moves, such as when a user has the mouse down and dragging the cursor around screen, the client may update the hotspot with its location. The hotspot may then provide a dragged image to get the user's feedback. For example, the hotspot may provide a wire frame and/or a full-fledged shape with a fill or a gray. Once the user releases the mouse, the hotspot object may commit the changes and the changes may be encoded for the DVP. Consistent with embodiments of the invention, the changes may be stored in a changelist object that the user and/or the client may apply in whole and/or in part. When the changes are committed, the DVP may reflect all those changes internally to the data visualization.

Figure 2:
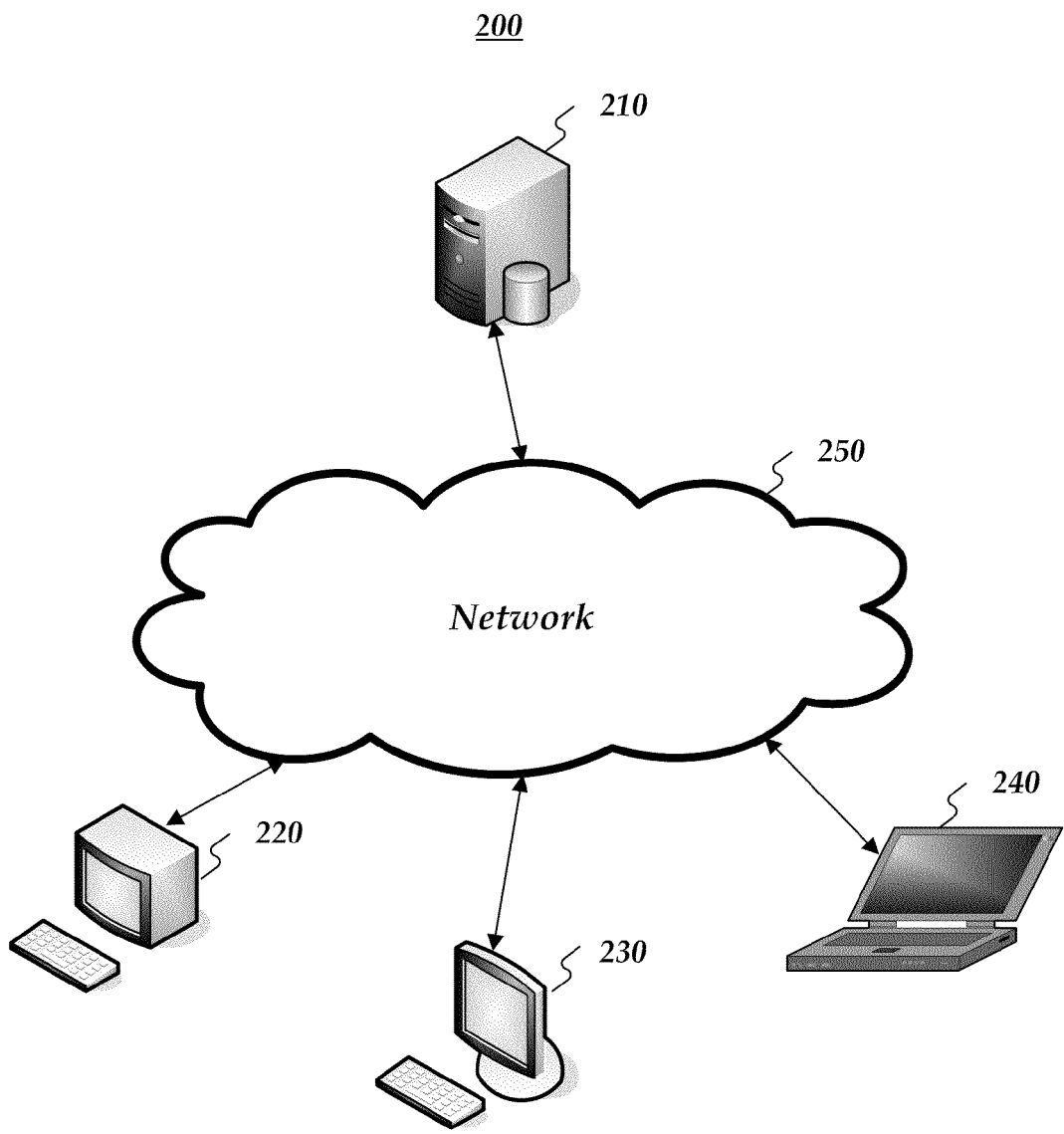
FIG. 2 is a diagram of an operating environment.

FIG. 2 is a diagram of an operating environment 200. Operating environment 200 may comprise a database server 210, a Windows® client 220, a Macintosh® client 230, and a mobile client 240. Database server 210, Windows® client 220, Macintosh® client 230, and mobile client 240 may each comprise a computing device 700, described in greater detail below with respect to FIG. 7, and may be connected via a network 250 such as the Internet or a corporate intranet. Windows® client 220, Macintosh® client 230, and mobile client 240 may each comprise a rendering platform and a data visualization platform. For example, Windows® client 220 may comprise Windows® data visualization platform 105 and Macintosh® client 230 may comprise OS X® data visualization platform 150. The data visualization platforms of Windows® client 220, Macintosh® client 230, and mobile client 240 may each comprise shared core 100. Each client may provide a different rendering platform used to display a visualization.

Interactivity may be accomplished primarily via clicking and/or dragging an input device 712 such as a mouse, a touchpad, a multi-touch display, a touch screen, and/or a stylus. Keyboard-based interactivity may also be provided. Consistent with embodiments of the invention, each client may support additional user interface devices and/or features. For example, Macintosh® client 230 may provide support for an Apple Remote® user interface device that may not be supported by Windows® client 220.

Figure 3A:
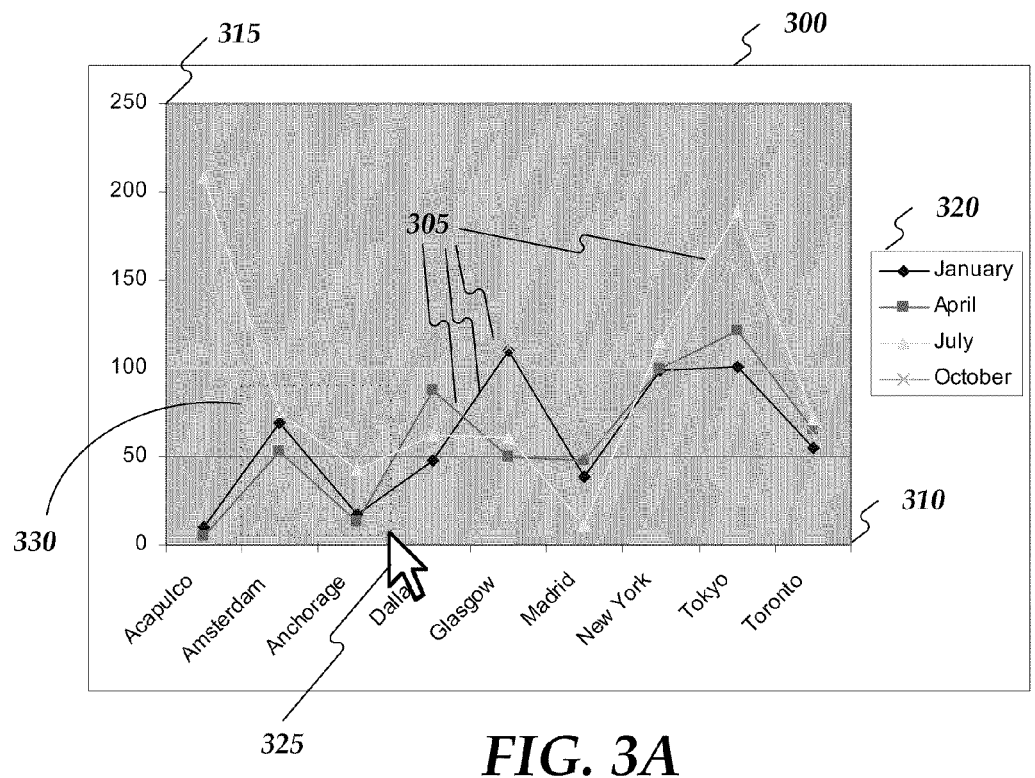
FIG. 3 is a diagram illustrating an interactive feature.
Figure 3B:
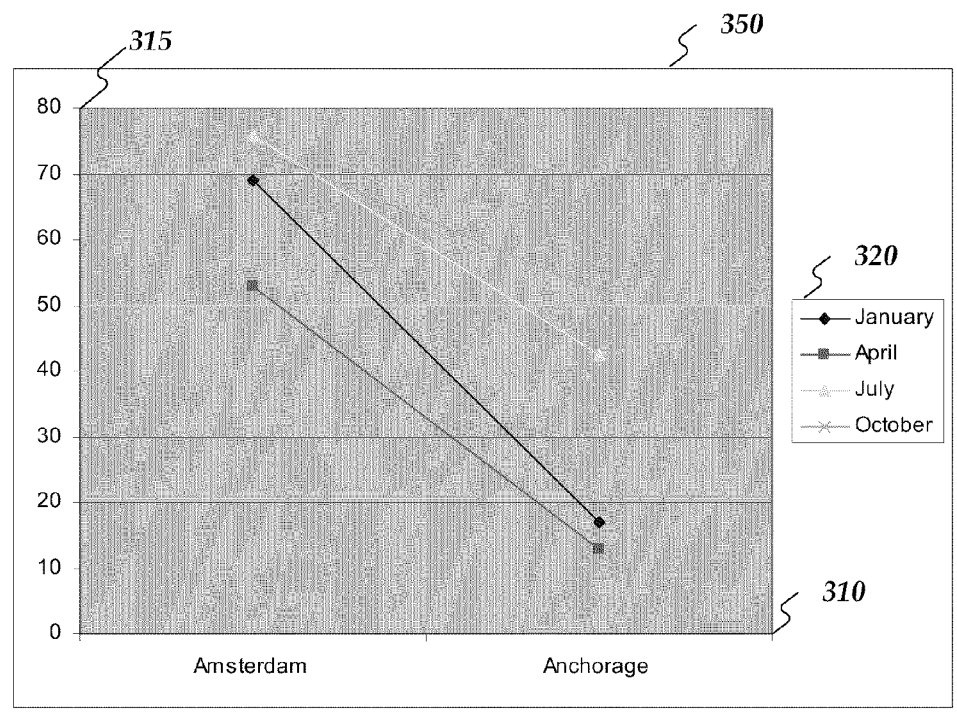

FIG. 3 is a diagram illustrating an interactive feature. For example a line chart 300 may comprise a plurality of data sets 305 plotted on a graph. Line chart 300 may further comprise an x-axis 310, a y-axis 315, and a legend 320. Line chart 300 may be generated by Windows® data visualization platform 105 on Windows® client 220 according to chart-type information associated with shared core 100 and data stored on database server 210. Consistent with embodiments of the invention, data described by line chart 300 may be stored locally on Windows® client 220 and/or another computing device. Windows® data visualization platform 105 may expose hotspots to the rendering platform of Windows® client 220. For example, hotspots may be exposed allowing interactivity with legend 320 and/or x-axis 310 such as changing the name of one of the plurality of data sets 305.

Interactive locations in a visualization may be exposed via a built-in collection of 'hotspot' objects. Each visualization layout type may expose hotspots specific to the layout. For example, a column chart may expose a hotspot to drag the top edge of the column vertically. A pie chart may expose a hotspot for each side of a pie slice that can be dragged in a clockwise or counterclockwise direction. Moving or rotating shapes such as legends and titles may be exposed via generic shape hotspots.

Hotspots may be exposed to a client via hit-testing. The client may use an integration object to determine what objects are beneath a mouse cursor 325. Shared core 100 may return a reference to a hit shape and/or a reference to a newly created hotspot. Shared core 100 may delegate hotspot detection to an active layout class for the chart that may analyze which geometry curves were hit. If no area corresponding to an interactive feature was hit, shared core 100 may return no hotspot reference. If a hotspot was hit, shared core 100 may create a new reference-counted hotspot object that may record an initial hit-test position. The rendering platform may get a description of what changes will occur and may display an appropriate cursor and/or tooltip and/or ignore the hotspot.

Once the client detects that a hotspot is being dragged with the mouse, it may go into a standard drag-drop loop. For example, Windows® client 220 may enter an Object Linking and Embedding (OLE) drag and drop and/or a simple message loop. Inside the loop, each mouse movement by, for example, a method that reports a position to which mouse cursor 325 has been dragged. The client may query the hotspot for an updated change list and/or as a drag image such as a drag image 330. The type of change associated with a hotspot may change based on the location of the mouse. For example, dragging a pie slice outward from a pie chart may simply move the shape, whereas dragging the pie slice over another pie slice may reorder the data.

Drag image 330 returned via a hotspot may be received by the client in the form of a geometry iterator that may be the same object used to draw the static image of the chart. Thus, once a client is able to draw a chart, it should be able to draw a drag image by invoking the same code. Inside shared core 100, drag image 330 may be generated by creating a temporary shape cloned from the original geometry and altered to reflect the current changelist.

When the mouse up event occurs, the drag-drop operation may be over and the changes may need to be committed. At this time, the client may query the hotspot one last time for its change list and may commit the changelist to shared core 100 to apply the changes internally. Consistent with embodiments of the invention, the client may walks the change list and selectively apply the changes however it wishes. For example, an Office® chart client may push data changes back to an Excel® worksheet, letting changes trickle back to shared core 100 at a later time.

Another exposed interactivity in line chart 300 may comprise, for example, a visual adjustment feature such as a zoom operation. Win32 integration object 130 may receive a mouse down (e.g. mouse button click) event from a user input device and begin tracking additional input and adding each input to a changelist until a mouse up (e.g. muse button release) event is received. For example, a user may position cursor 325 at one position and drag the mouse to select an area of line chart 300. Shared core 300 may provide a platform-independent graphical representation to the user to indicate the selected area, such as drag image 330. Once the mouse up event is received, Win32 integration object 130 may commit the changelist to shared core 100 that may in turn generate an updated visualization 350 that may display an enlarged visualization of the selected area of line chart 300.

The hotspots exposed by shared core 100 may represent a comprehensive set of known interactivities gathered from existing data visualization clients. There may be hotspots shared core 100 did not expose that the client wants or there may be scenarios where a built-in hotspot will not suffice. Consistent with embodiments of the invention, shared core 100 may expose additional APIs to allow the client to extend as necessary. For example, shared core 100 may expose APIs for clients to retrieve layout-specific hit-testing information, to provide datapoint geometry iteration, and/or to provide what-if change prediction.

Clients may want to understand what interesting parts of the layout are beneath the mouse cursor. For example, Office apps may want to annotate a chart with a connector arrow from the drawing shapes. To do so, shared core 100 may need to provide sub-element hit-test information like "Over data point #3 in series #1" or "over the growth edge of a data point" or "over a value axis tickmark with value 10".

Data points may be rendered as paths within a series shape. Clients may want to highlight individual data points (e.g. on mouse hover) and so may require the ability to iterate over the geometry specific to a single data point and not the entire series.

Clients may require a full chart to be handed back with the change predictively applied in a what-if scenario. For example, when reordering data points, a client may wish to show a data point properly inserted into its new location rather than show an 'insertion marker' ghost. To do this, the client may create and hand a changelist to shared core 100 which may then create a copy-on-write clone of the chart, apply the changelist, and hand back a geometry iterator pointed at the new chart for the client to draw.

Changes made to shared core 100 via API access or user interaction (e.g. hotspots) should be undoable. To achieve this, a transaction object may exist in shared core 100 to allow the client to demark and record changes at a command level. For example, the transaction object may expose a GetUndoRecord( )method that hands back an UndoRecord object to store undo/redo information. The UndoRecord object may have Undo( ) and Redo( ) methods to be invoked from the client's undo/redo commands. For user changes made via HotSpots, the changelist object returned by the HotSpot may also expose a transaction object to track its undo/redo state.

Figure 4:
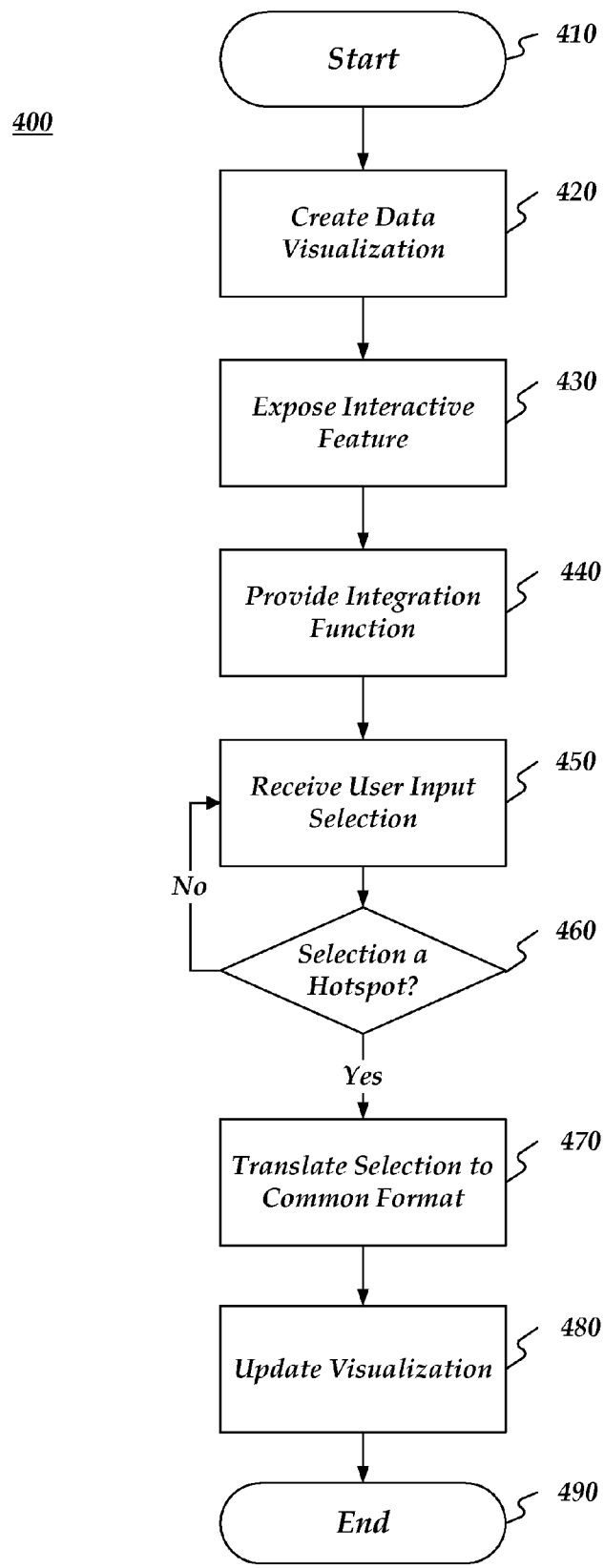
FIG. 4 is a flow chart of a method for providing an interactivity visualization architecture.

FIG. 4 is a flow chart setting forth the general stages involved in a method 400 consistent with an embodiment of the invention for providing a data visualization interactivity architecture. Method 400 may be implemented using a computing device 700 as described in more detail below with respect to FIG. 7. Ways to implement the stages of method 400 will be described in greater detail below. Method 400 may begin at starting block 410 and proceed to stage 420 where computing device 700 may create a data visualization. For example, computing device 700 may comprise windows client 220 and may use Windows® data visualization platform 105 to create a visualization such as a pie chart, a bar chart, a scatter chart, a column chart, a line chart, an area chart, a doughnut chart, a radar chart, a surface chart, a bubble chart, and a stock chart.

From stage 420, method 400 may advance to stage 430 where computing device 700 may expose at least one interactive feature for the data visualization. For example, computing device 700 may expose a hotspot associated with an interactive feature such as a data modification feature, a data filtering feature, and/or a visual adjustment feature.

From stage 430, method 400 may advance to stage 440 where computing device 700 may provide an integration object associated with at least one of a plurality rendering platforms. For example, computing device 700 may use a rendering platform such as GDI, GDI+, Silverlight, WPF, C# winforms, and/or QT to render graphical displays and/or data visualizations.

From stage 440, method 400 may advance to stage 450 where computing device 700 may receive a selection of at least one location on the data visualization from a user input device. For example, a user may select a point on the data visualization using a mouse, a stylus, a keyboard, and/or a touch screen.

From stage 450, method 400 may advance to stage 460 where computing device 700 may determine whether the selected at least one location is associated with a hotspot. For example, computing device 700 may determine whether the selected at least one location comprises a data point, a structural element of the data visualization such as an axis line, a user interface menu item, a user interface command element, and/or a data visualization control element.

If, at stage 460, computing device 700 determines that the selected at least one location is associated with a hotspot, method 400 may advance to stage 470 where computing device 700 may translate the selection of the at least one interactive feature via the integration object into a common format associated with the data visualization platform. Translating the selection via the integration object into a common format is described below in greater detail with respect to FIG. 5. If, at stage 460, computing device 700 determines that the selected at least one location is not associated with a hotspot, method 400 may return to stage 450 where computing device 700 may wait to receive another user input selection.

From stage 470, method 400 may advance to stage 480 where computing device 700 may update the data visualization according to the selected interactive feature. Once computing device 700 updates the data visualization in stage 480, method 400 may then end at stage 490.

Figure 5:
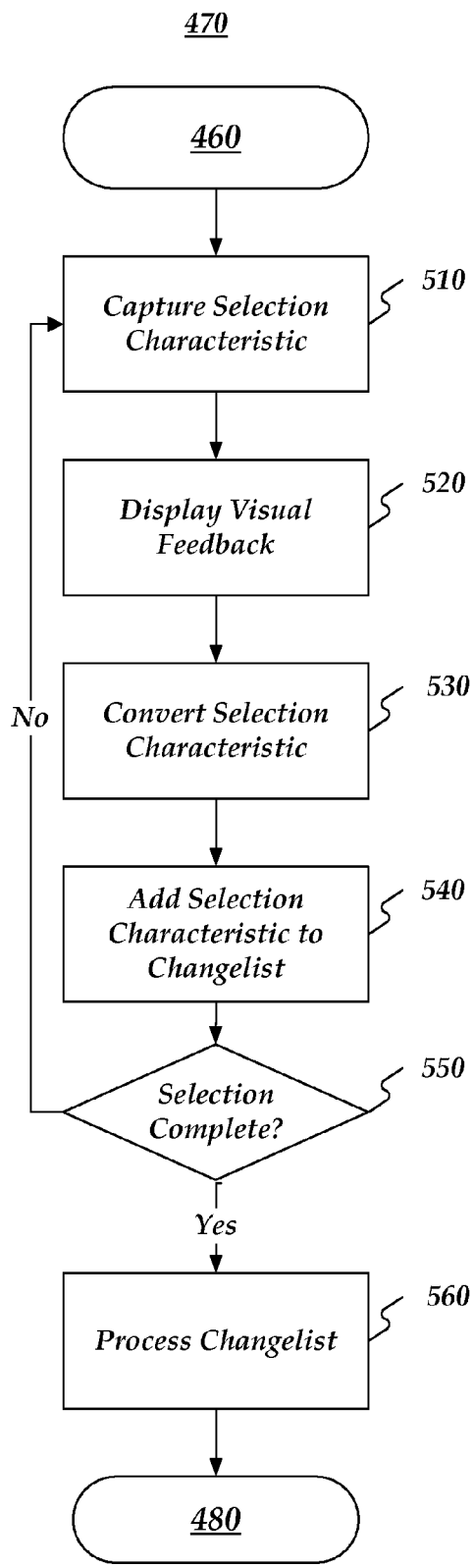
FIG. 5 is a flow chart of a subroutine used in the method of FIG. 4 for translating a selected element to a common format.

FIG. 5 is a flow chart of a subroutine used in the method of FIG. 4 for translating a selected element to a common format. Subroutine 470 may being at stage 510, where computing device 700 may capture at least one characteristic of the selection. For example, computing device 700 may capture a selection characteristic such as a mouse click, a drag operation, a drop operation, a mouse movement, a scroll operation. Consistent with embodiments of the invention, the captured at least one characteristic may be encoded in a format associated with a rendering platforms.

From stage 510, subroutine 470 may advance to stage 520 where computing device 700 may display a visual feedback associated with the at least one characteristic. For example, computing device 700 may display a visual feedback such as changing a cursor, drawing a line, drawing a shape, changing a title, changing a status display, and/or displaying a tooltip.

From stage 520, subroutine 470 may advance to stage 530 where computing device 700 may convert the captured selection characteristic from an encoding format associated with the rendering platforms to a common encoding format associated with the data visualization platform. For example, the data visualization platform may use the associated integration object to convert the selection characteristic.

From stage 530, subroutine 470 may advance to stage 540 where computing device 700 may create a change list according to the converted at least one characteristic of the selection. For example, computing device 700 may create a changelist in response to receiving a mouse down selection characteristic. Once a changelist has been created, computing device 700 may append further selection characteristics to the changelist as they are received.

From stage 540, subroutine 470 may advance to stage 550 where computing device 700 may determine whether a user selection is complete. For example, computing device 700 may determine that the user has completed a drag-drop loop by releasing the mouse button.

If, at stage 550, computing device 700 determines that the user selection is complete, subroutine 470 may advance to stage 560 where computing device 700 may submit the changelist for processing. For example, computing device 700 may submit the changelist to the data visualization platform. If, at stage 550, computing device 700 determines that the user selection is not complete, subroutine 470 may return to stage 510 where computing device 700 may wait to receive and capture another user input selection. Once computing device 700 processes the changelist in stage 560, subroutine 470 may end and advance to stage 480 of method 400.

An embodiment consistent with the invention may comprise a system for providing data visualization interactivity. The system may comprise a memory storage and a processing unit coupled to the memory storage. The processing unit may be operative to create a data visualization according to a shared layout, expose at least one interactive feature for the data visualization, provide an integration object associated with at least one of a plurality rendering platforms, select the at least one interactive feature, translate the selection of the at least one interactive feature via the integration object into a common format associated with the shared layout, and modify the data visualization according to the selected interactive feature. An integration object may be provided for each of the plurality of rendering platforms. The shared layout may be independent of the rendering platforms and may comprise, for example, a pie chart, a bar chart, a scatter chart, a column chart, a line chart, an area chart, a doughnut chart, a radar chart, a surface chart, a bubble chart, and/or a stock chart. The interactive feature may comprise, for example, a data modification feature, a data filtering feature, and/or a visual adjustment feature. Selection of the at least one interactive feature may comprise receiving a selection input from at least one of: a mouse, a stylus, a keyboard, and/or a touch screen.

The processing unit may be further operative to receive a location for a pointer of a user input device and retrieve information about the received location, wherein the information comprises at least one of: a description of possible modifications to the data visualization associated with the location and a description of at least one data point at the location. The information about the received location is displayed in a tooltip.

The processing unit may be further operative to expose at least one hotspot object specific to the layout, such as a wedge manipulation interactive feature in a pie chart. A hotspot object may be associated with at least one structural element of the data visualization, such as a graph axis line.

Another embodiment consistent with the invention may comprise a system for providing extensible interactivity for a data visualization. The system may comprise a memory storage and a processing unit coupled to the memory storage. The processing unit may be operative to create a data visualization according to a set of data, expose at least one hotspot, receive a selection of the at least one hotspot, create a changelist associated with the selection of the at least one hotspot, store a plurality of user input commands in the changelist, process the changelist, and update the data visualization according to the processed changelist. For example, mobile client 240 may open a chart file. A data visualization platform (DVP) may create a data visualization according to the data in the chart file and expose at least one hotspot area of the chart associated with an interactive feature. A user may select the exposed hotspot with a user input device, and mobile client 240 may receive feedback from the DVP to provide to the user, such as changing the user input device's cursor appearance and/or displaying a tooltip. The feedback may be associated with the at least one interactive feature associated with the hotspot, such as changing the cursor to a hand when selecting a column edge to indicate that the column edge may be dragged to widen or narrow the column.

As the user manipulates the data visualization, each user input manipulation may be added to the changelist as a command. When the user has finished manipulating the data visualization, such as may be indicated by a mouse up event, the changelist may be processed by mobile client 240. For example, mobile client 240 may commit the changelist to the DVP; the DVP may then iterate through each command added to the changelist and update the data visualization accordingly. Consistent with embodiments of the invention, mobile device 240 may allow the user to view the commands in the changelist and apply them in whole and/or in part, such as by selecting at least one of the commands in the changelist to apply to the data visualization.

Yet another embodiment consistent with the invention may comprise a system for providing data visualization interactivity. The system may comprise a memory storage and a processing unit coupled to the memory storage. The processing unit may be operative to create a data visualization according to a layout associated with a data visualization platform, expose at least one interactive feature for the data visualization, provide an integration object associated with at least one of a plurality rendering platforms, wherein the rendering platform comprises, for example, GDI, GDI+, Silverlight, WPF, C# winforms, receive a selection of at least one location on the data visualization from a user input device, and determine whether the selected at least one location is associated with a hotspot. The user input device may comprise a mouse, a stylus, a keyboard, and/or a touch screen. Determining whether the selected at least one location is associated with a hotspot may comprises determining whether the selected at least one location comprises a data point, a structural element of the data visualization, a user interface menu item, a user interface command element, and/or a data visualization control element.

In response to determining that the selected at least one location is associated with a hotspot, the processing unit may be further operative to translate the selection of the at least one interactive feature via the integration object into a common format associated with the data visualization platform. To translate the selection, the processing unit may be further operative to capture at least one characteristic of the selection, display at least one visual feedback associated with the at least one characteristic, convert the at least one characteristic of the selection from the encoding format associated with the at least one of the plurality rendering platforms to a common encoding format associated with the data visualization platform, create a change list according to the converted at least one characteristic of the selection, and submit the change list to the data visualization platform. The processing unit may be further operative to update the data visualization according to the submitted change list and at least one property of the hotspot at the at least one selected location. Consistent with embodiments of the invention, the at least one visual feedback may comprise, for example, changing a cursor, drawing a line, drawing a shape, changing a title, changing a status display, and/or displaying a tooltip. The at least one characteristic of the selection may comprise, for example, a mouse click, a drag operation, a drop operation, a mouse movement, and/or a scroll operation. The captured at least one characteristic may be encoded in a format associated with at least one of the plurality rendering platforms.

Figure 6A:
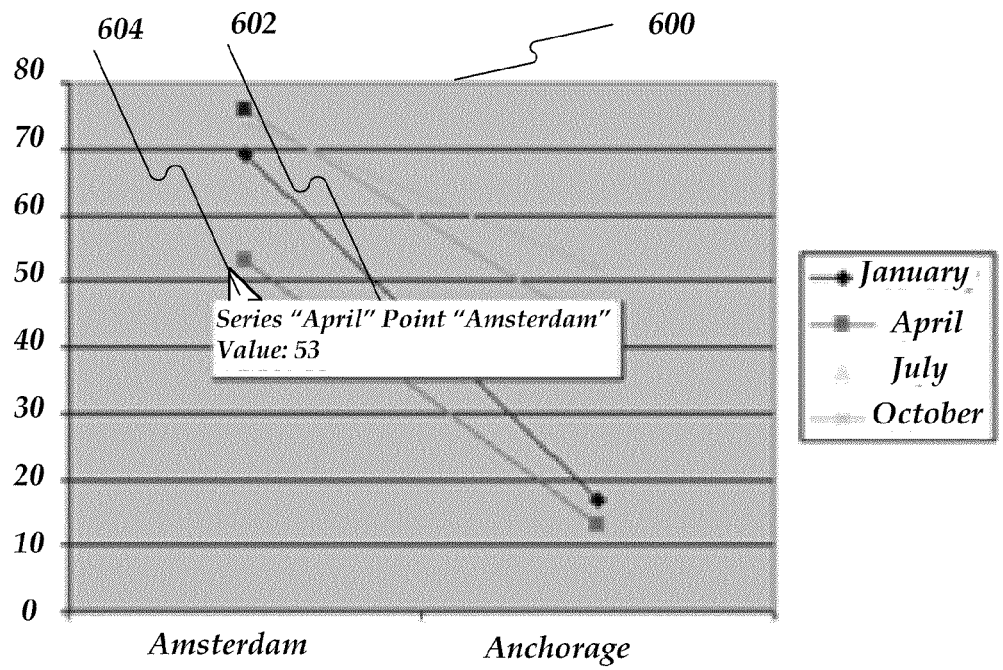
FIGS. 6A-6J are diagrams illustrating interactive chart types and features.

FIG. 6A illustrates a line chart 600 and comprises a tooltip 602 displayed as a user feedback to positioning a user input cursor 604 over a hotspot.

Figure 6B:
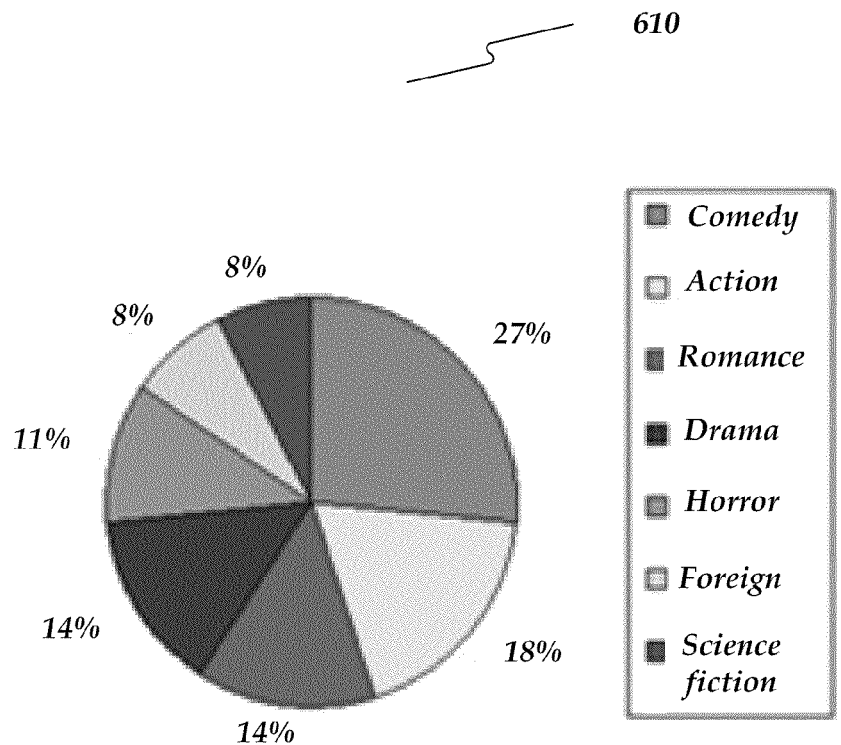
Figure 6C:
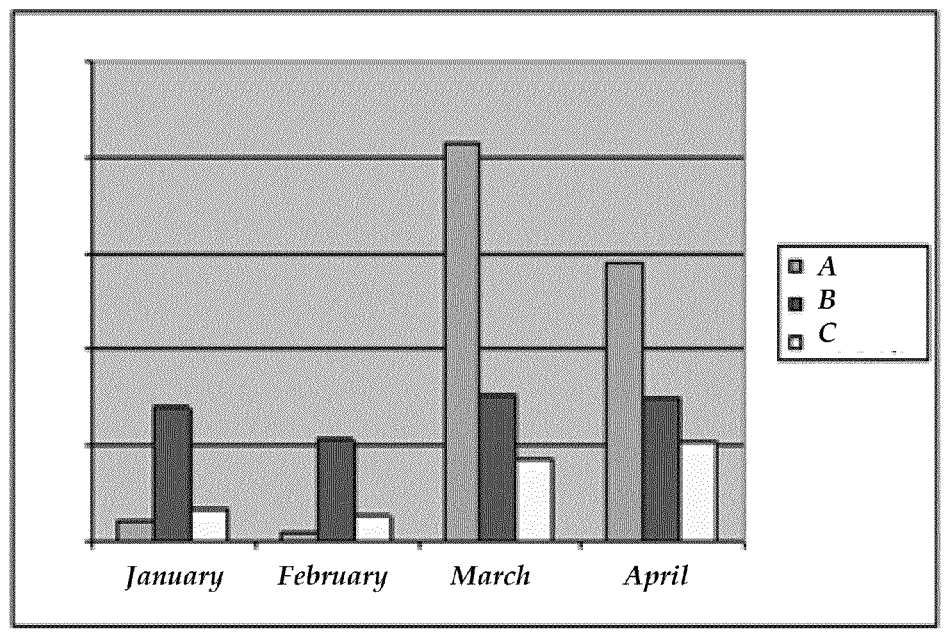
Figure 6D:
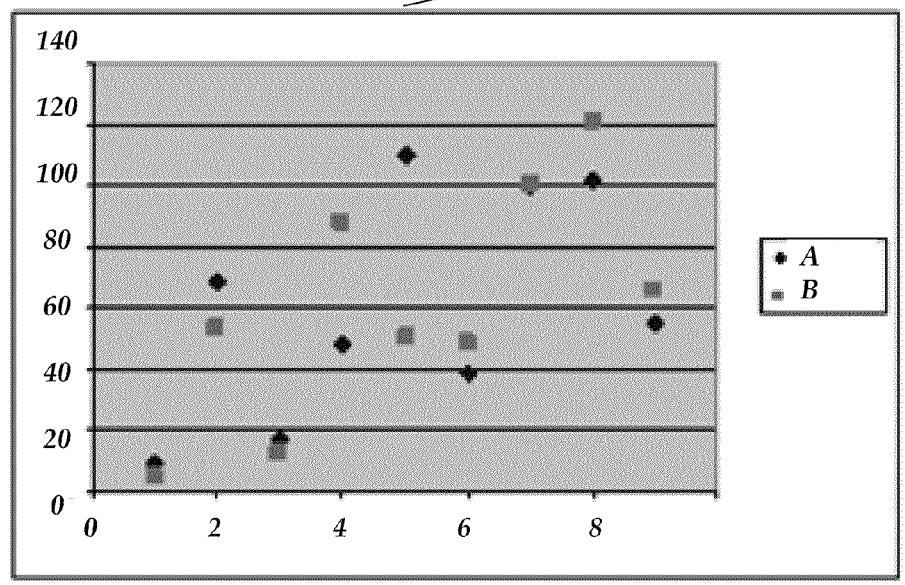
Figure 6E:
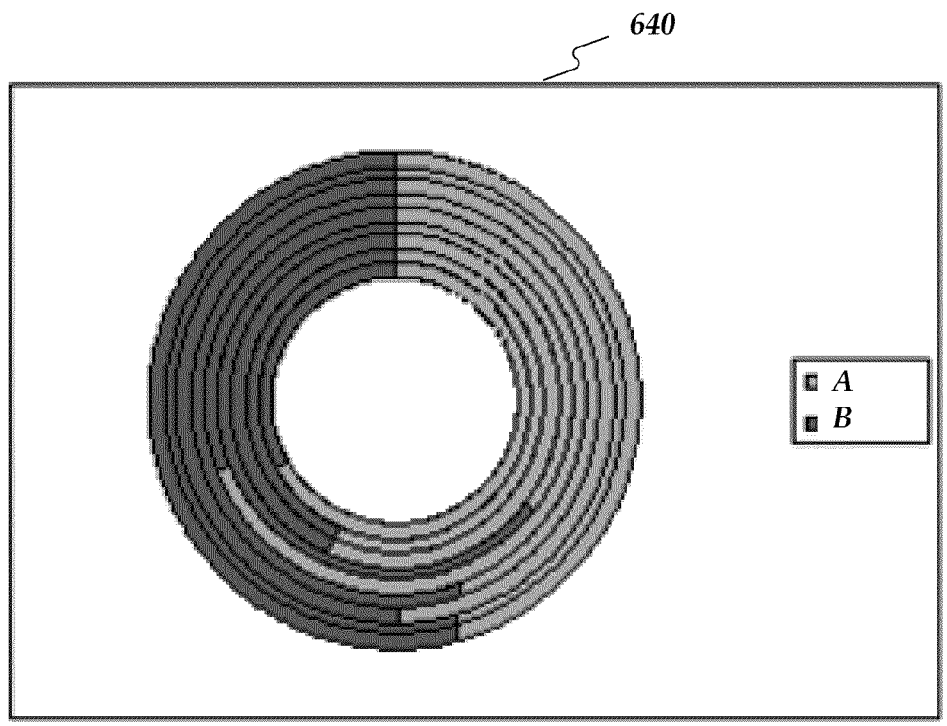
Figure 6F:
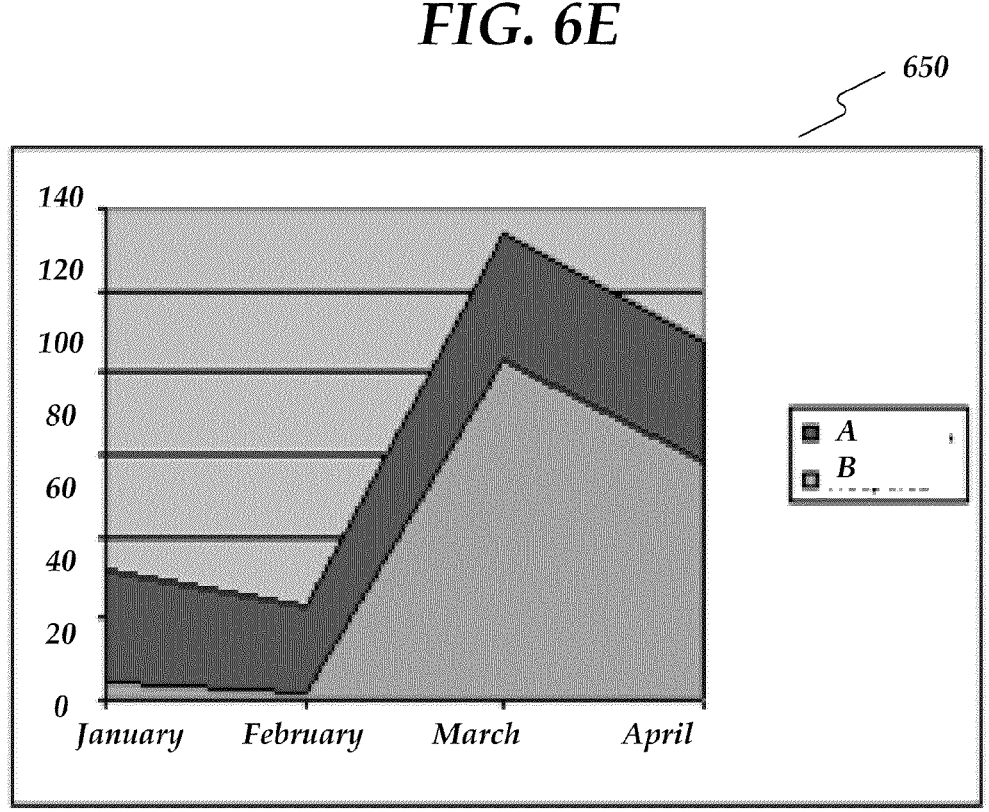
Figure 6G:
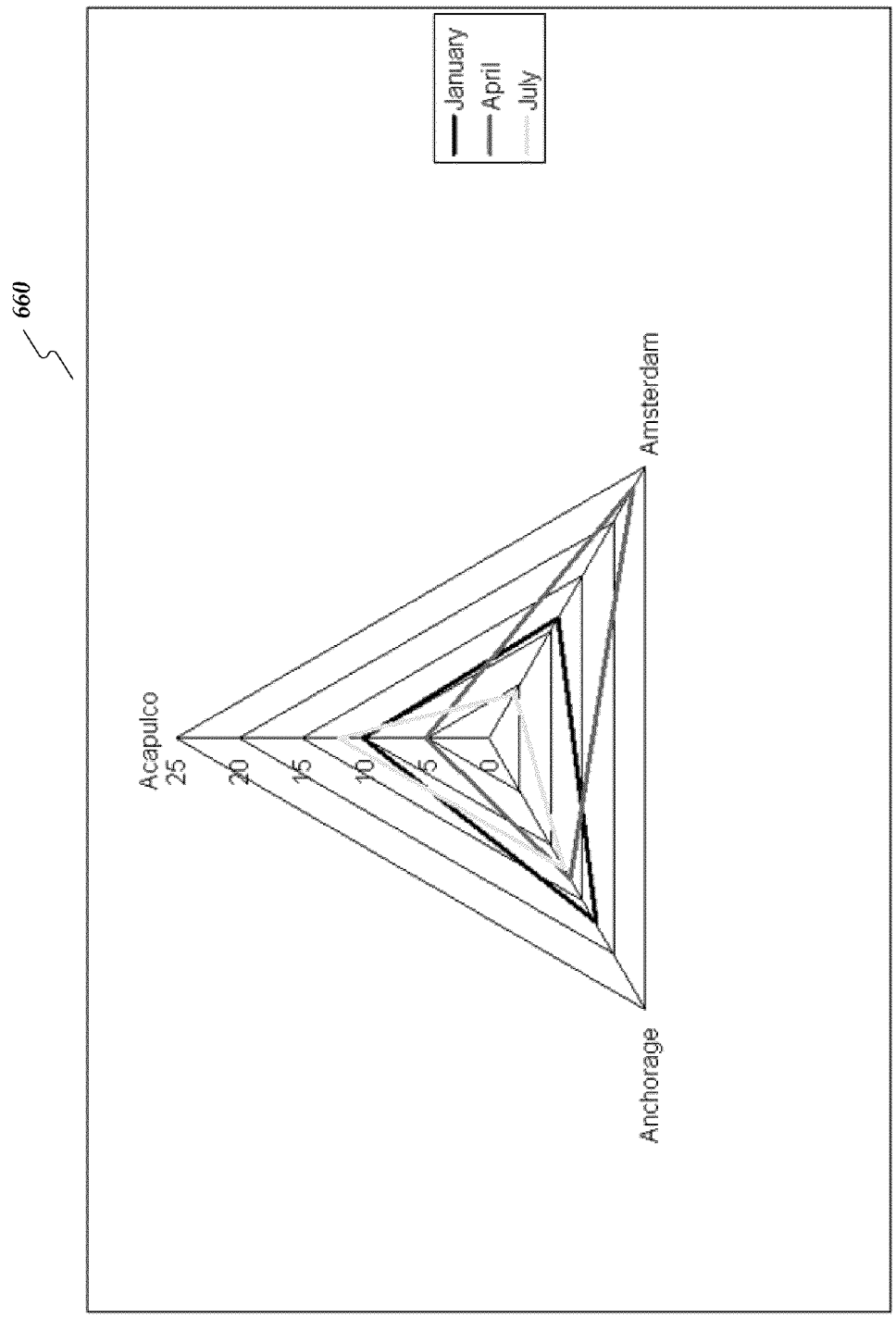
Figure 6H:
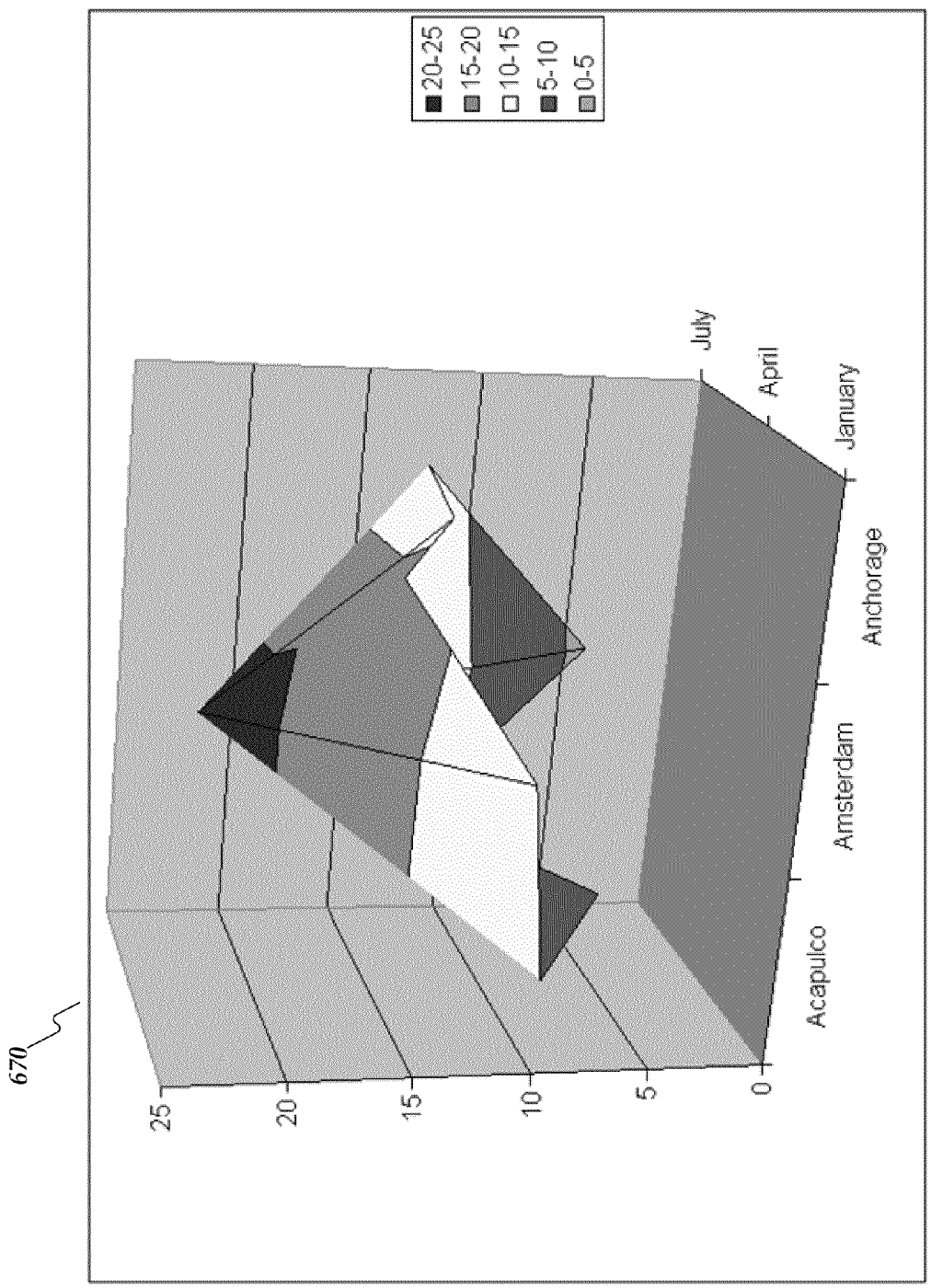
Figure 6I:
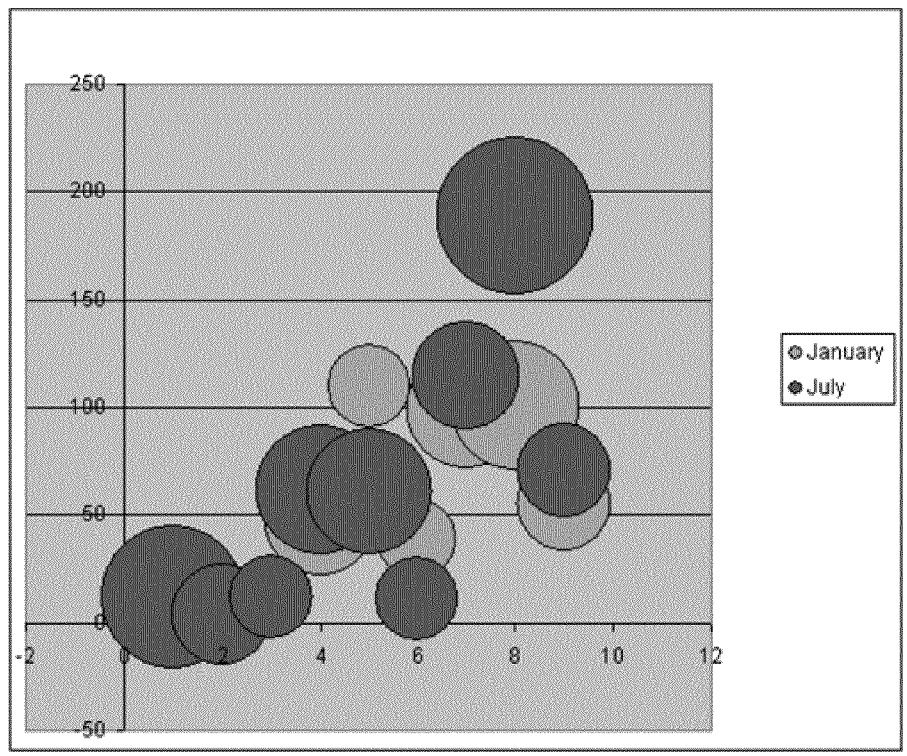
Figure 6J:
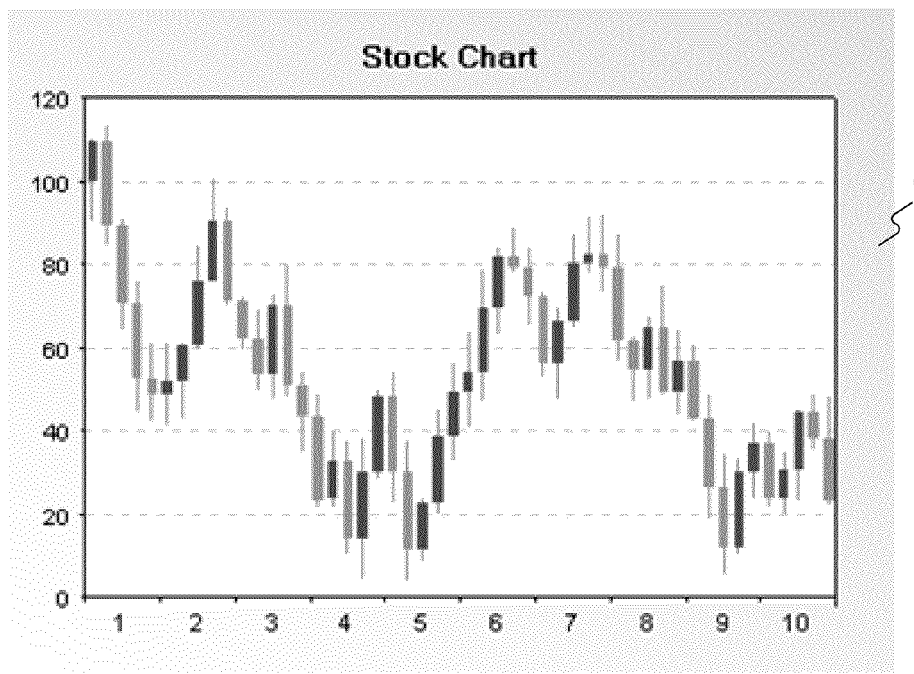

FIG. 6B illustrates a line chart 610.
FIG. 6C illustrates a bar (or column) chart 620.
FIG. 6D illustrates a scatter chart 630.
FIG. 6E illustrates a doughnut chart 640.
FIG. 6F illustrates an area chart 650.
FIG. 6G illustrates a radar chart 660.
FIG. 6H illustrates a surface chart 670.
FIG. 6I illustrates a bubble chart 680.
FIG. 6J illustrates a stock chart 690.

Figure 7:
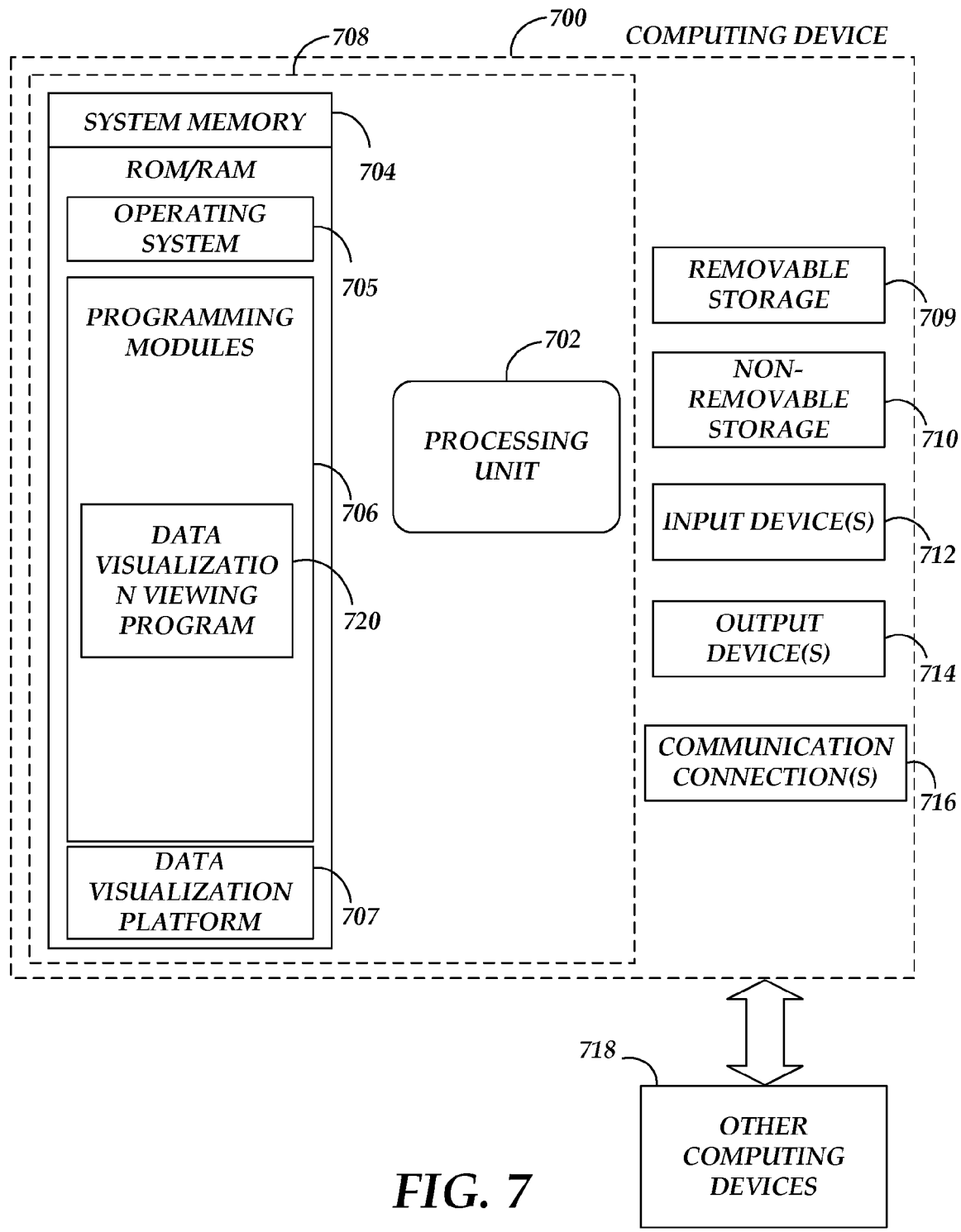
FIG. 7 is a block diagram of a system including a computing device.

FIG. 7 is a block diagram of a system including computing device 700. Consistent with an embodiment of the invention, the aforementioned memory storage and processing unit may be implemented in a computing device, such as computing device 700 of FIG. 7. Any suitable combination of hardware, software, or firmware may be used to implement the memory storage and processing unit. For example, the memory storage and processing unit may be implemented with computing device 700 or any of other computing devices 718, in combination with computing device 700. The aforementioned system, device, and processors are examples and other systems, devices, and processors may comprise the aforementioned memory storage and processing unit, consistent with embodiments of the invention. Furthermore, computing device 700 may comprise an operating environment for system 100 as described above. System 100 may operate in other environments and is not limited to computing device 700.

With reference to FIG. 7, a system consistent with an embodiment of the invention may include a computing device, such as computing device 700. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a data visualization platform 707. Operating system 705, for example, may be suitable for controlling computing device 700's operation. In one embodiment, programming modules 706 may include a data visualization viewing program 720. Furthermore, embodiments of the invention may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g. data visualization viewing program 720) may perform processes including, for example, at least one of method 400's stages as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing data visualization interactivity, the method comprising:
   providing a core of visualization services capable of being shared between different computer operating system types;
   providing a plurality of functions to the core of visualization services for providing interactive visualizations;
   creating a data visualization of a layout of data using a data visualization platform;
   exposing at least one interactive feature for the data visualization of the layout using the plurality of functions provided to the core of visualization services;
   providing an integration object associated with at least one of a plurality rendering platforms and having integration code to provide generic interface information usable by the data visualization platform for the at least one of the plurality rendering platforms;
   selecting the exposed at least one interactive feature for the data visualization of the layout created using the data visualization platform;
   translating the selected at least one interactive feature via the integration object associated with the rendering platform of the data visualization platform into a format common to the plurality of functions of the core of visualization services providing interactive visualizations; and
   modifying the data visualization according to the selected interactive feature independent of the rendering platform using a function from the core of visualization services based on the translating of the interactive feature.

2. The method of claim 1, further comprising providing at least one integration object for each of the plurality of rendering platforms.

3. The method of claim 1, further comprising:
   receiving a location for a pointer of a user input device; and
   retrieving information about the received location, wherein the information comprises at least one of: a description of possible modifications to the data visualization associated with the location and a description of at least one data point at the location.

4. The method of claim 3, wherein the information about the received location is displayed in a tooltip.

5. The method of claim 1, wherein the rendering platform is independent of the layout.

6. The method of claim 1, wherein the at least one interactive feature comprises a data modification feature.

7. The method of claim 1, wherein the at least one interactive feature comprises a data filtering feature.

8. The method of claim 1, wherein the at least one interactive feature comprises a visual adjustment feature.

9. The method of claim 1, wherein the layout comprises at least one of: a pie chart, a bar chart, a scatter chart, a column chart, a line chart, an area chart, a doughnut chart, a radar chart, a surface chart, a bubble chart, and a stock chart.

10. The method of claim 1, further comprising exposing at least one hotspot object specific to the layout.

11. The method of claim 10, wherein the at least one hotspot object is associated with at least one structural element of the data visualization.

12. The method of claim 10, wherein the selection of the at least one interactive feature comprises receiving a selection input from at least one of: a mouse, a stylus, a keyboard, and a touch screen.

13. A non-transitory computer-readable storage medium which stores a set of instructions which when executed performs a method for providing extensible interactivity for a data visualization, the method executed by the set of instructions comprising:
   providing a core of visualization services capable of being shared between different computer operating system types;
   providing a plurality of functions to the core of visualization services for providing interactive visualizations;
   creating a data visualization of a layout of data using a data visualization platform;
   exposing at least one interactive feature for the data visualization of the layout using the plurality of functions provided to the core of visualization services;
   providing an integration object associated with at least one of a plurality rendering platforms and having integration code to provide generic interface information usable by the data visualization platform for the at least one of the plurality rendering platforms;
   selecting the exposed at least one interactive feature for the data visualization of the layout created using the data visualization platform;
   translating the selected at least one interactive feature via the integration object associated with the rendering platform of the data visualization platform into a format common to the plurality of functions of the core of visualization services providing interactive visualizations; and
   modifying the data visualization according to the selected interactive feature independent of the rendering platform using a function from the core of visualization services based on the translating of the interactive feature.

14. The computer-readable medium of claim 13, wherein the data visualization comprises a chart.

15. The computer-readable medium of claim 13 further comprising exposing a hotspot specific to the layout, wherein the hotspot comprises a location on the data visualization associated with at least one interactive feature.

16. The computer-readable medium of claim 13, further comprising providing feedback to a user in response to receiving the selection of the hotspot, wherein the feedback comprises at least one of: changing a user input cursor appearance and displaying a tooltip.

17. The computer-readable medium of claim 16, wherein the provided feedback is associated with at least one interactive feature associated with the selected hotspot.

18. A system for providing data visualization interactivity, the system comprising:
   a memory storage; and
   a processing unit coupled to the memory storage, wherein the processing unit is operative to:
      provide a core of visualization services capable of being shared between different computer operating system types;
      provide a plurality of functions to the core of visualization services for providing interactive visualizations;

create a data visualization of a layout of data using a data visualization platform;

expose at least one interactive feature for the data visualization of the layout using the plurality of functions provided to the core of visualization services;

provide an integration object associated with at least one of a plurality rendering platforms and having integration code to provide generic interface information usable by the data visualization platform for the at least one of the plurality rendering platforms;

select the exposed at least one interactive feature for the data visualization of the layout created using the data visualization platform;

translate the selected at least one interactive feature via the integration object associated with the rendering platform of the data visualization platform into a format common to the plurality of functions of the core of visualization services providing interactive visualizations; and modify the data visualization according to the selected interactive feature independent of the rendering platform using a function from the core of visualization services based on the translating of the interactive feature.

* * * * *